US00H002169H

(19) United States
(12) Statutory Invention Registration
Richeson et al.

(10) Reg. No.: US H2169 H
(43) Published: Sep. 5, 2006

(54) METHOD OF MANUFACTURING PARTIALLY CRYSTALLINE POLYESTER ARTICLES

(75) Inventors: Donald Edward Richeson, N Canton, OH (US); Clem Branum Shriver, Clinton, OH (US)

(73) Assignee: Shell Oil Company, Houston, TX (US)

(21) Appl. No.: 07/686,088

(22) Filed: Apr. 16, 1991

Related U.S. Application Data

(63) Continuation of application No. 07/559,471, filed on Jul. 30, 1990, now abandoned, which is a continuation of application No. 07/200,218, filed on May 31, 1988, now abandoned, which is a division of application No. 06/928,723, filed on Nov. 7, 1986, now abandoned, which is a continuation of application No. 06/710,774, filed on Mar. 11, 1985, now abandoned.

(51) Int. Cl.
*C08J 5/34* (2006.01)

(52) U.S. Cl. ..... 524/88; 524/605; 525/177; 528/308.1; 528/308.2

(58) Field of Classification Search ..... 525/177; 528/308.1, 308.2; 524/605, 88
See application file for complete search history.

(56) References Cited

U.S. PATENT DOCUMENTS

| | | | | | |
|---|---|---|---|---|---|
| 3,201,506 | A | * | 8/1965 | Bills | 264/210.6 |
| 3,579,609 | A | * | 5/1971 | Sevenich | 264/210.6 |
| 3,627,625 | A | * | 12/1971 | Jarrett | 264/211 |
| 3,644,482 | A | * | 2/1972 | Dexter et al. | 524/291 |
| 3,720,732 | A | * | 3/1973 | Sevenich | 264/210.6 |
| 3,904,578 | A | * | 9/1975 | Kawase et al. | 524/291 |
| 3,907,926 | A | * | 9/1975 | Brown et al. | 525/444 |
| 3,960,807 | A | * | 6/1976 | McTaggert | 524/291 |
| 3,975,485 | A | * | 8/1976 | Bollen et al. | 264/171 |
| 3,987,004 | A | * | 10/1976 | Georgoudis | 524/291 |
| 4,048,128 | A | * | 9/1977 | Eastman | 524/604 |
| 4,272,475 | A | * | 6/1981 | Chi | 264/210.6 |
| 4,463,121 | A | * | 7/1984 | Gartland et al. | 524/291 |
| 4,572,852 | A | * | 2/1986 | Gartland et al. | 525/177 |

FOREIGN PATENT DOCUMENTS

| | | | |
|---|---|---|---|
| EP | 114288 | * | 8/1984 |
| JP | 55-154130 | * | 12/1980 |

OTHER PUBLICATIONS

Cowell: *Plastics Engineering*—Oct. 1976 (51–57).*
Goodman & Rhys: *Polyesters,* vol. 1, Saturated Polymers (1965) pp. 56–58.*
Henman: "Meet Stabilization of Polypropylene", *Developments in Polymer Stabilization—1,* Gerald Scott, editor (1979) 39–99.*

* cited by examiner

*Primary Examiner*—M. Clement
(74) *Attorney, Agent, or Firm*—Denise Y. Wolfs

(57) ABSTRACT

A method of making a polyethylene terephthalate/polyolefin blend for sheeting and thermoformed articles which has improved color stability and can be recycled many times. A heat stabilizer is melt blended only with the polyolefin prior to its incorporation into the polyethylene terephthalate. The PET and polyolefin are then blended and extruded into sheeting and subsequently thermoformed into articles useful as microwave oven trays.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MANUFACTURING PARTIALLY CRYSTALLINE POLYESTER ARTICLES

This is a Continuation of application Ser. No. 07/559,471, filed on Jul. 30, 1990, now abandoned, which is a Continuation of application Ser. No. 07/200,218, filed on May 31, 1988, now abandoned, which is a Divisional of application Ser. No. 06/928,723, filed on Nov. 7, 1986 (now abandoned), which is a Continuation of application Ser. No. 7,710,774, filed on Mar. 11, 1985 (now abandoned).

BACKGROUND OF THE INVENTION

This invention relates to a method of making a polyethylene terephthalate/polyolefin blend sheeting for use in thermoforming partially crystalline heat set articles. In particular the invention describes a method for adding the antioxidant exclusively to the polyolefin prior to blending with the polyethylene terephthalate.

BACKGROUND ART

The growing popularity of microwave ovens has created a general interest in production of lost cost, microwave transparent, disposable containers for packaging food. The precooked prepared food may be placed in the container and subsequently frozen. The consumer will finish cooking the frozen food package in a microwave oven or a conventional convection oven prior to its use. The requirements which this type of dual ovenable tray application places on the container to be utilized are many and varied. Firstly, the container must be capable of withstanding prolonged high temperature exposure without significant loss of impact strength or dimensional stability. Secondly, the container must maintain a uniform color and be resistant to any degradation which may alter the color during long term high temperature exposure in a microwave or conventional oven. U.S. Pat. No. 4,463,121 describes a method of manufacturing a partially crystalline polyester article consisting of a major component of polyethylene teraphthalate (PET) and a minor component of a polyolefin to produce an article which has a total crystallinity of about 10 to about 30%. These articles are usable as containers and exhibit stable impact strength and dimensional stability due to the limitation on the degree of crystallinity achieved during thermoforming. This patent also teaches the desirability of adding from about 0.05 to about 2 weight percent of a heat stabilizer to the PET/polyolefin blend for the purpose of stabilizing the intrinsic viscosity of the article.

U.S. Pat. No. 3,960,807 teaches a process for thermoforming articles from a composition having three essential components (1) a crystallizable polyester; (2) a crack stopping agent, preferably a polyolefin; (3) a nucleating agent. The process disclosed in this patent improved the impact resistant of the article and the rate of crystallization during thermoforming.

In attempting to produce thin-walled articles such as microwave dual ovenable trays or containers made without antioxidant it was found that thermal aging of the trays made by the methods of U.S. Pat. Nos. 4,463,121 or 3,960,807 three distinct problems were consistently encountered, all related to high temperature exposure, (1) a drop in intrinsic viscosity of the tray; (2) a tendency to discolor in brown or yellow hues; (3) the appearance of irregular yellow or brown patches on the tray surface particularly where the tray had been touched by someone's hand. This latter phenomena will be described herein as fingerprinting. The method of this invention effectively eliminates the three thermal degradation phenomena listed above by efficiently incorporating into the polyolefin an effective heat stabilizer or antioxidant prior to the polyolefin being blended with the PET resin. The method provides effective protection of the material with levels of antioxidant of one tenth to one hundredth of what is required when the antioxidant is added to the polyester or the blend of polyester/polyolefin.

An object of an aspect of this invention is to provide a method of manufacturing sheeting from polyethylene terephthalate and a polyolefin which is thermally stable during subsequent thermoforming operations on the sheeting. A derived benefit of the use of the method of this invention is the production of thin-walled articles or trays which resist discoloration or fingerprinting during high temperature thermal aging. An advantage of the invention is that a microwave or conventional oven tray manufactured from the method of this invention can withstand in excess of an hour at 200° C. with no discoloration, fingerprinting or substantial loss of intrinsic viscosity. A further advantage is that fractional levels of antioxidant will adequately protect the tray.

BRIEF DESCRIPTION OF THE INVENTION

The objects and advantages of an aspect of this invention may be obtained by using a method of manufacturing an amorphous, thermally stable polyolefin modified polyethylene terephthalate sheet comprising the steps of:

(a) melt blending an effective amount of a heat stabilizer with a polyolefin derived from olefin monomers containing two to six carbon atoms to form a stabilized polyolefin;

(b) heating a polyethylene terephthalate having an intrinsic viscosity of about 0.65 to about 1.2 to at least 150° C. in a dry atmosphere for a time sufficient to reduce the moisture level in the polyethylene terephthalate below 0.02 weight percent to form a dry polyethylene terephthalate:

(c) mixing a minor amount of said stabilized polyolefin with a major amount of dry polyethylene terephthalate to form a homogeneous molten melt blend;

(d) forming a sheet from said homogeneous melt blend;

(e) cooling said sheet to form a substantially amorphous sheet;

Another aspect of the invention resides in a method of manufacturing a thermally stable, partially crystalline heat set, non-oriented article comprising the steps of:

(a) melt blending an effective amount of a heat stabilizer with a polyolefin derived from olefin monomers containing two to six carbon atoms to form a stabilized polyolefin;

(b) heating a polyethylene terephthalate having an intrinsic viscosity of about 0.65 to about 1.2 to at least 150° C. in a dry atmosphere for a time sufficient to reduce the moisture level in the polyethylene terephthalate below 0.02 weight percent to form a dry polyethylene terephthalate;

(c) simultaneously conveying said dry polyethylene terephthalate and said stabilized polyolefin to a means for melt blending;

(d) mixing a minor amount of said stabilized polyolefin with a major amount of dry polyethylene terephthalate to form a homogeneous molten melt blend;

(e) forming a sheet from said homogeneous melt blend;

(f) positioning said amorphous sheet over a mold;

(g) thermoforming said sheet to form an article in a heated mold for a time sufficient to achieve crystallinity of between 15 and 35 percent;

(h) stripping said article out of said heated mold; and (i) trimming said article out of said sheet.

Yet another aspect of the invention is a method of manufacturing a recylable polyolefin modified polyethylene terephthalate sheet comprising the steps of:

(a) melt blending an effective amount of a heat stabilizer with a polyolefin derived from olefin monomers containing two to six carbon atoms to form a stabilized polyolefin;

(b) heating a polyethylene terephthalate having an intrinsic viscosity of about 0.65 to about 1.2 to at least 150° C. in a dry atmosphere for a time sufficient to reduce the moisture level in the polyethylene terephthalate below 0.02 weight percent to form a dry polyethylene terephthalate;

(c) simultaneously conveying said dry polyethylene terephthalate and said stabilized polyolefin to a means for melt blending;

(d) mixing a minor amount of said stabilized polyolefin with a major amount of dry polyethylene terephthalate to form a mixture;

(e) melt blending said mixture to form a homogeneous molten melt blend;

(f) forming a sheet from said homogeneous melt blend;

(g) cooling said sheet to form a substantially amorphous sheet;

(h) positioning said amorphous sheet over a mold;

(i) thermoforming said sheet in a heated mold for a time sufficient to achieve partial crystallization of said amorphous sheet;

(j) stripping the partially crystalline sheet out of said heated mold;

(k) trimming out the portion of the sheet which was in contact with the mold surface to leave a matrix of the amorphous sheet; and (l) grinding said matrix to form regrind and heating said regrind according to step (b) and then mixing said regrind with said mixture formed in step (d) and repeating steps (e) through (l) at least one additional time.

DETAILED DESCRIPTION OF THE INVENTION

In order to produce articles or containers usable in applications where high service temperatures are encountered, a polyester in the crystalline state rather than the amorphous state is necessary. Of the known thermoplastic, crystallizable polyesters, polyethylene terephthalate (hereinafter PET) offers the desirable properties of good high temperature dimensional stability, chemical, oil and solvent resistance and the ability to pass microwave radiation without absorbing or reflecting it. These properties make it the polymer of choice for use in high temperature food containers.

The polyethylene terephthalate polymer is obtained by known polymerization techniques from either terephthalate acid or its lower alkyl ester (dimethyl terephthalate) and ethylene glycol. The terephthalic acid or dimethyl terephthalate is esterified or transesterified and then polycondensed with ethylene glycol to a high molecular weight product. For use in this invention the polyester so produced should have an intrinsic viscosity ranging from about 0.65 to about 1.2 and preferably from about 0.80 to about 1.05 as measured in a 60/40 by volume mixed solvent of phenol/tetrachloroethane at 30° C. Known methods of solid state polymerization may be employed to achieve the higher intrinsic viscosities.

In order to utilize polyethylene terephthalate in viable commercial forming processes such as thermoforming it is essential that the desired level of crystallinity be achieved in a very short cycle time. An acceptable cycle time would be about 5 to 7 seconds. Polyethylene terephthalate polymer, completely unmodified, exhibits crystallization rates too slow to achieve the required cycle times. To overcome the slow crystallization rate, nucleating agents may be added in order to increase the number of crystallites formed. Most known nucleating agents are inorganic materials having an average particle size of from 2 to 10 microns. Other known nucleating agents are carbonaceous materials such as carbon black and graphite. Common nucleating agents may be talc, gypsum, silica, calcium carbonate, alumina, titanium dioxide, pryophylite silicates, finely divided metals, powdered glass, carbon black, and graphite. The common feature shared by the foregoing list of known nucleating agents is that they exist in solid, form within the temperature range of 100° C. to 300° C. where polyesters are forming crystalline structures. Any of these particulate nucleating agents may be used to good advantage, although a leveling off of degree of crystallinity occurs if these particulate nucleating agents are reduced or eliminated.

The second essential component of this invention is a polyolefin, which must be present with the polyethylene terephthalate. Polyolefins as used herein are those produced from olefin monomers having from 2 to 6 carbon atoms. The resulting polymer contains repeat units derived from the original monomer units. These repeat units differ from the monomers in that they no longer contain a carbon—carbon double bond. Such polymers include low density polyethylene, high density polyethylene, linear low density polyethylene, polypropylene, polyisopropylene, polybutene, polypentene, polymethylpentene. The polyolefin should be present in levels of from 0.5 to 15 weight percent of the total composition. The preferred range was found to be from 1 to 5 weight percent. Most preferred is 2 to 4 weight percent. A preferred class of polyolefins is the polyethylene with the most preferred type being linear low density polyethylene (LLDPE), as represented by products marketed by Dow Chemical under the tradenames DOWLEX 2045 and 2035. When compared to unmodified PET, all the polyolefins provide improved impact strength in the finished article and improved mold release in the thermoforming process. The polyethylene and polypropylene have broader operating temperature ranges, faster rates of crystallization and lower temperatures for the onset of crystallinity. These improvements lead to faster cycle times, more parts per minute and a lower cost finished article.

The use of the polyolefins with the PET was found to give rates of crystallization at least as fast as PET compositions which contained both the polyolefin and an additional nucleating agent such as described in U.S. Pat. No. 3,960,807.

It is known that heat stabilizers or antioxidants may be added to polyethylene terephthalate, however, the problem of protecting the PET/polyolefin blend from thermal degradation in environments where the thermoplastic blend is subjected to heating at temperatures at near 200° C. for a period approaching one hour becomes particularly difficult. This is especially pronounced when the article which is to be made from the PET/polyolefin blend is to come in contact with food due to the desirability of minimizing the amount of stabilizers or antioxidants present. It was quite unexpectedly discovered that the PET/polyolefin blend may be optimumly protected by adding a relatively low level of antioxidant or stabilizer directly to the polyolefin component before the PET/polyolefin blend is made. This method of incorporating the heat stabilizer prior to the blending of the PET and polyolefin provides a method for insuring (1) a minimal loss in intrinsic viscosity during processing and subsequent heat aging; (2) eliminating discoloration of the blend during high temperature exposure; and (3) elimination of the development of fingerprints or blotchy areas of discoloration during high temperature aging. Heat stabilizers as used herein are compounds which demonstrate antioxidant properties, the most important of which is the capability of inhibiting oxidation. An effective heat stabilizer in the practice of this invention must be capable of protecting the thermoformed, heat set polyester article during exposure to elevated temperatures. U.S. Pat. No. 3,987,004, U.S. Pat. No. 3,904,578 and U.S. Pat. No. 3,644,482 disclose many examples of known heat stabilizers. The following compounds are representative of useful heat stabilizers in the practice of this invention: alkylated substituted phenols, bisphenols, substituted bis phenols, thiobisphenols, polyphenols, thiobisacrylates, aromatic amines, organic phosphites and polyphosphites. The particular aromatic amines which demonstrate specific heat stabilizing capabilities include: primary polyamines, diarylamines, bisdiarylamines, alkylated diarylamines, ketone-diarylamines condensation products, aldehyde-amine condensation products, and aldehyde amines. Conditions which would be considered severe in the practice of this invention would be those in which the thermoformed, heat set article would be exposed to temperatures near 200° C. for a period exceeding 30 minutes. Preferred heat stabilizers for such severe high temperature applications particularly where any staining or discoloration from the heat stabilizer is undesirable are the polyphenols which have more than two phenol ring structures in the compound. Polyphenols which are useful include, but are not limited to: tetrakis(methylene 3-(3,5-ditertiarybutyl-4-hydroxyphenyl)-propionate) methane, and 1,3,5-trimethyl-2,4,6-tris(3,5-ditertiary butyl-4-hydroxybenzyl)benzene. The latter polyphenol is most preferred. The heat stabilizers may advantageously be added at levels up to 2 weight percent but more preferred are levels below 0.05 weight percent based on the total PET/polyolefin/stabilizer composition. The most preferred level is between 0.005 and 0.03 weight percent.

The antioxidant is added by melt blending directly into the polyolefin component of the polymer blend. Thus it is understood that the polyolefin component will contain the appropriate larger weight percent of antioxidant appropriate for the finished ratio of PET to polyolefin. The particular level used is determined by the degree of protection required, the identity of the particular stabilizer chosen, the severity of the heat exposure and any solubility limitation in the polyolefin. When food trays are the article being produced by the method of this invention appropriate regulations regarding materials in contact with food must be taken into consideration and generally form an upper bound on the amount of antioxidant which may be added to either component and to the finished blend of polymers.

The method of manufacturing a polyolefin modified polyethylene terephthalate sheet includes the steps of (1) melt blending a suitable heat stabilizer with a polyolefin derived from monoolefins having from 1 to 4 carbon atoms to form a stabilized polyolefin. (2) the polyethylene terephthalate having an intrinsic viscosity of from 0.65 to 1.2 must be heated above its glass transition temperature in a dry air or nitrogen atmosphere and maintained in that condition until a moisture level low enough to reduce hydrolytic degradation during subsequent method steps is attained. (3) The stabilized polyolefin and the dried polyethylene terephthalate resin is simultaneously conveyed in appropriate proportion to an extruder where the two components are melt blended to form a homogeneous molten blend thereof. (4) Forming a sheet from the homogeneous molten blend. (5) Quenching the sheet to form a substantially amorphous sheet.

The melt blending of the heat stabilizer may be accomplished in the post-polymerization stage of the production of the polyolefin or it may be accomplished by the use of any conventional thermoplastic mixing extruder which will adequately disperse the antioxidant throughout the polyethylene which has been rendered molten in the barrel of the extruder. The process step wherein the polyethylene terephthalate resin is heated in a dehumidified atmosphere of nitrogen or air is necessary to maintain the intrinsic viscosity level of the resin. Any moisture level is suitable which maintains a sufficiently high intrinsic viscosity level during the remaining process steps of the method. Maintenance of the lowest practicable moisture level is advantageous. Generally levels below 0.02% are required. Mositure less than 0.005% is most preferred for high intrinsic viscosity PET. Due to the requirement of good impact resistance and dimensional stability of containers to be made in this invention it is essential that the PET be carefully handled to maintain its high intrinsic viscosity. The mixing of the polyolefin containing the antioxidant with the dried PET may be accomplished in any conventionally known film extrusion technique where the polyolefin and PET are heated above their glass transition points and blended through shearing of the molten material to form a homogeneous blend of the two dissimilar plastics.

It is presumed that the polyolefin is dispersed throughout the PET but maintains its identity in a separate phase. The forming of the sheet may be done by any conventional film forming technique. The sheets which are utilized in the examples which follow were produced on a Prodex film extruder where the molten sheet was extruded onto a chilled casting roll and immediately cooled to minimize crystallinity buildup. Table I shows the sheet extrusion conditions which were utilized to produce the amorphous sheeting used to make the trays in the examples of the Specification.

TABLE I

| SHEET EXTRUSION CONDITIONS | |
|---|---|
| Extruder Size | 1.75" Prodex |
| Extruder Zones | 288° C. |
| Throat Cooling | Yes |
| Screw Cooling | No |
| Extruder Speed | 94 rpm |
| Extruder Pressure | 19 MPa |
| Extruder Amps | 10.5 |
| Polymer Temp | 296° C. |
| Adapter Zones | 277° C. |
| Die Zone 1, 2, 3 | All 288° C. |
| Casting Roll 1 | 75° C. |
| Casting Roll 2 | 63° C. |
| Take-up Speed | 1.2 mm/min |
| Sheet Dimensions | 0.76 mm × .4 m |
| Material | PET 97%/LLDPE 3% |

The manufacture of heat set thin-walled trays which are made from the sheeting produced from stabilized polyolefin/PET can be made by using any of the known thermoforming methods including vacuum assist, air assist, mechanical plug assist or matched mold. The mold should be preheated to a temperature sufficient to achieve the degree of crystallinity desired. Selection of optimum mold temperature is dependent upon type of thermoforming equipment, configuration and wall thickness of articles being molded and other factors. The operable range of mold temperatures is 150–215° C. The preferred range is 170–190° C.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 35 percent. For containers to be used in high temperature food application it was found that levels of crystallinity above 15 percent were necessary for adequate dimensional stability during demolding and during oven exposure.

The heat set part can be stripped out of the mold cavity by known means for removal. One method, blow back, involves breaking the vacuum established between the mold and the formed sheet by the introduction of compressed air. Once the heat set part has been removed from the mold, the portion of the sheeting which remains in the original planar state is trimmed away to leave the finished tray. Since most commercial thermoforming molds will contain a plurality of cavities for production of many trays from a single sheet, the dinking out of the trays will leave a flat matrix of the original sheet which has the outline of the trays removed. Anywhere from 10 to 60% of the original sheet remains in the matrix and must be recycled in order to make the thermoforming operation economically feasible. This recycling of the matrix means that a very substantial amount of thermal heat history is built into the sheeting. When 40% of the sheeting is recycled it is estimated that certain portions of the polyolefin PET blend will be subjected to five full recycle steps. These recycle steps include: (1) being ground; (2) heated into dry atmosphere; (3) melt blended with virgin material entering the system; (4) being formed into sheet; (5) quenched; (6) subsequently reheated prior to entry into the thermoforming mold; (7) drawing and heat setting in the thermoformer; (8) subsequently cooling the part; and (9) stripping the part. All these steps are repeated five times. Thus, the resin is subjected to the very high temperatures of sheet manufacturing and thermoforming over a much longer time period than would first appear to be the case. This severe high temperature exposure is detrimental to the intrinsic viscosity of the PET and to the stability of the polyolefin component and it was not until this invention that it was recognized that the manner in which the PET polyolefin blend was protected was found to be critical, particularly in processes where recycle approached 40%. In the following examples a 1.04 intrinsic viscosity polyethylene terephthalate was used either alone or with linear low density polyethylene (LLDPE) available from Dow Chemical under the trade identification Dowlex 2045. The PET wil the LLDPE was dried and extruded according to the conditions of Table I and the 0.76 mm sheets were subsequently thermoformed on a Comet Labmaster thermoformer into a 13 cm×13 cm square tray having a depth of 2.5 cm. All percent expressions are weight percent based on the total weight of the composition, polymer sheet or tray.

UNSTABILIZED FOOD TRAYS

EXAMPLES 1–2

The 1.04 intrinsic viscosity polyethylene terephthalate sheeting was formed into trays. The intrinsic viscosity was determined after the thermoforming of the trays was complete and those trays were then aged at 200° C. in a circulating air oven for one hour. The intrinsic viscosity was then tested again. The results are shown in Table II under Example 1. Example 2 was a 97% PET/3% LLDPE sheet with no antioxidant added. It is clear from the results shown in Table II that PET alone or PET blended with a polyolefin such as linear low density polyethylene undergoes a substantial drop in intrinsic viscosity during high temperature aging when unprotected with an antioxidant or stabilizer system. This loss of intrinsic viscosity would be totally unacceptable in food trays for Example 3 would be characteristic of the articles produced having no antioxidant included according to the teachings of U.S. Pat. No. 4,463, 121.

TABLE II

| | Sheeting Formulation | | | AO Added | | AO Addiction Method | | | Aging Effects* | | | |
|---|---|---|---|---|---|---|---|---|---|---|---|---|
| | | | | | | | | | | Intrinsic Viscosity | | |
| Example | % PET | % LLDPE | % AO | PET | LLDPE | Master Batch | PET in Reactor | Direct to LLDPE | Finger-prints | Original | 1 hr @ 200° C. | Color |
| 1 | 100 | 0 | 0 | No | No | — | — | — | No | .870 | .60 | Stable |
| 2 | 97 | 3 | 0 | No | No | — | — | — | Yes | .810 | .69 | Stable |
| 3 | 97 | 3 | 0.1 | Yes | No | — | Yes | — | Yes | .881 | .874 | Discolors |
| 4 | 97 | 3 | 0.19 | Yes | Yes | Yes | Yes | — | No | .888 | NA | Discolors |
| 5 | 97 | 3 | .009 | No | Yes | — | — | Yes | Yes | .926 | .929 | Stable |
| 6 | 97 | 3 | 0.015 | No | Yes | — | — | Yes | Trace | .921 | .957 | Stable |
| 7 | 97 | 3 | 0.024 | No | Yes | — | — | Yes | No | .937 | .945 | Stable |

*All aging is one hour at 200° C.
NA—Not available

COMPARATIVE RESULTS

EXAMPLES 3–7

All samples in this group of examples were made from PET/LLDPE sheets which contained varying levels of the most preferred polyphenol antioxidant, specifically 1,3,5-trimethyl-2,4,6,-tris(3,5-ditertiarybutyl-4-hydroxylbenzyl) benzene, available from Ethel Corporation under the trade designation Ethanox 330. The percent AO shown in Table II under the sheeting formulation is the percent of antioxidant based on the weight of the total sheet composition. In this series of experiments the objective was to evaluate the effect of thermal heat aging at 200°C. on three properties which are important to trays usable for microwave and conventional ovens. These characteristics are: (1) Fingerprints—this term represents a phenomenon which manifests itself as irregular and widely spaced discolorations on an aged tray sample. The discoloration occurs typically on surfaces of the tray which have been touched by human hands. This sporadic blotchiness in Table II has either a yes or no value under the fingerprint category of aging effects. It is to be understood that if the entry is "yes" fingerprints appeared after aging. If the entry is "no" the tray retained its original uniform appearance; (2) Color—the term color designates the retention or lack of retention of the original color of the tray after one hour aging at 200° C. The appearance of discoloration is a uniform change in the hue of the tray. If the entry under the column color is "stable" it denotes that the color did not change after aging. If the entry is "discolors" it indicates that a discernible degree of discoloration resulted from the thermal aging; (3) Intrinsic Viscosity—intrinsic viscosity tends to decline when PET is subjected to high temperature. The original intrinsic viscosity is tested and compared to the intrinsic viscosity value after one hour at 200° C. The variables in Examples 3–7 include the level of AO, the component to which the AO is added and the method of adding the AO.

Example 3

In Example 3 0.1% of AO was added to the PET in the melt phase during production of the polyethylene terephthalate polymer. The intrinsic viscosity was maintained satisfactorily but the relatively high level of AO in the PET contributed to discoloration of the PET polymer utilized in the blend. This discoloration was a general yellowing to brown from the normal milky white of the virgin PET resin. It is speculated that the high temperatures experienced during PET production and the prolonged high temperature maintenance during solid stating of the the base resin to a high intrinsic viscosity (1.04) all contribute to the overall discoloration. This discoloration is very objectionable in applications such as food trays. In addition, the aged samples showed fingerprinting which is also unsatisfactory.

Example 4

Example 4 is a blend identical in polymer composition to Example 3 but 0.19% antioxidant was added. The antioxidant was added both to the PET in the reactor and to the linear low density polyethylene in the master batch. The column under AO addition method which is designated as "master batch" indicates a procedure whereby an initial master batching step is taken in which a 77/23 weight percent PET/LLDPE were mechanically blended in particulate pellets to form a master batch.

This master batch blend of PET and linear low density polyethylene was subsequently simultaneously fed to a Prodex film extruder along with PET resin in a ratio of 13 to 87 weight percent to yield a final LLDPE percentage of 3 and a PET percentage of 97. This master batch method achieves an improved dispersion of polyethylene throughout the PET in a circumstance when the hoppers feeding the film extruder are not accurately calibrated to handle resin percentages as low as 3%. The intrinsic viscosity was maintained and no fingerprinting was evident, however, discoloration of the tray was evident with this higher level of antioxidant. The antioxidant has a distinct tendency to yellow when relatively high levels are added to the PET/polyolefin blend.

Examples 5–7

Film sheeting was prepared using a 97/3 weight percent ratio of PET/LLDPE along with varying in percentages of antioxidant. This series utilized the method of this invention in which the antioxidant was added to the linear low density polyethylene prior to any incorporation with the PET. No antioxidant is added to the PET and this method is described in the antioxidant addition method columns of Table III as the direct LLDPE. In this method, the antioxidant was added to the polyolefin by remelting the particulate polyolefin and homogeneously blending the desired level of antioxidant in the polyolefin and subsequently finishing the molten resin into the desired particulate form such as pellets, prilled beads or other desirable forms. This blending was done in a Sterling Transfermix extruder with the barrel temperature maintained at approximately 195° C. and the die at 175° C. The screw speed was 84 rotations per minute. The linear low density polyolefin is then accurately blended with the dried PET at the throat entrance to the film extruder. The film extruder homogeneously blends the PET with the stabilized linear low density polyolefin to form a uniform melt blend. The result shown in Table II regarding the aging properties of the trays made with the polyolefin stabilized blends show that even at extremely low levels of antioxidant the intrinsic viscosity is maintained and the color of the tray is stable during one hour aging at 200° C. Example 5 which uses a 0.009 weight percent of antioxidant shows evidence of fingerprinting while the Example 6 using a slightly higher level of antioxidant shows only a barely discernible trace of fingerprinting. Example 7 which uses 0.024 weight percent of AO shows no evidence of fingerprinting. This is in marked contrast to the Example 3 where nearly eight times the antioxidant level was required in order to eliminate fingerprinting and the resin displayed objectionable yellow color after aging.

RECYCLE TRIALS

EXAMPLES 8–22

When manufacturing trays by thermoforming from flat sheeting, a typicaly thermoforming process will yield approximately 40% scrap sheeting after each forming and trim cycle. The sheeting must be reground and mixed with incoming virgin PET/polyolefin material for reuse. This recycle produces considerable thermal heat history on the polymeric blend leading to degradation problems of discoloration, fingerprinting, intrinsic viscosity loss, and changes in crytallinity. In order to produce acceptable thermoformed trays for food all of the foregoing properties must be stabilized or eliminated in a commercial process involving substantial percentages of regrind. A typical thermoforming process will regrind up to 40%. Simulation of the steady state operation of such a thermoforming system assumes that the regrind will mean that the same resin must proceed through the sheet making and tray thermoforming system appromately five times. Accordingly, the following experimental scheme simulates the 40% rework, 5 cycle system for evaluating thermal stability. The resin utilized was 97% PET (1.04 intrinsic viscosity), 3% linear low density polyethylene, Dowlex 2045 available from Dow Chemical Company and 0.015% Ethanox 330, available from Ethel Corporation. The antioxidant was melt blended into the LLDPE using a Sterling Transfermix extruder and then pelletized for subsequent blending into a 1.75 inch (45 mm) Prodex film extruder along with the PET. The steps of the process are the following:

(1) The resin/regrind blends were dried four hours at 170° C. in a Conair dehumidifying hopper having a dry nitrogen atmosphere.

(2) after drying, each sample was placed in a 100° vacuum oven to keep it dry and equilibrate the temperature at 100° C.

(3) the 100° resin was placed in the extruder hopper and mixed with the LLDPE stabilized with antioxidant to achieve the correct percentage blend.

(4) the blended material was extruded into an amorphous sheet according to the specifications given previously on Table I.

(5) trays for testing were thermoformed in a Comet Labmaster thermoformer under the following conditions:

| | |
|---|---|
| Preheat Time in Oven | 12 seconds |
| Oven Temperatures | 315° C. top<br>225° C. bottom |
| Molding Time | 8 seconds |
| Molding Temperature | 160° C. |

The excess and unformed portions of the sheet were trimmed away from the trays which were thermoformed to yield a matrix for reprocessing for recycle.

(6) The remaining nonformed matrix sheet was crystallized at 150° C., cooled and ground through a 0.6 mm screen and mixed with fresh 97/3 PET/LLDPE resin at 60/40 of new resin/regrind. This resin and regrind blend was dried according to step 1 and the experimental steps 1–6 were repeated for five cycles. The following properties of the trays were taken from each of the five cycles: (1) intrinsic viscosity; (2) Hunter color value "B"; and (3) percent crystallinity as calculated from the densities of the trays. All results are reported in Table III.

TABLE III

| Example | Identification | Intrinsic Viscosity | Color* Reading | Density | % Crystallinity |
|---|---|---|---|---|---|
| 8 | 1st Regrind Sheet | .877 | −5.5 | 1.325 | — |
| 9 | Unaged Tray | .868 | −4.1 | 1.349 | 21.3 |
| 10 | Aged Tray | .859 | −1.4 | 1.360 | 31.0 |
| 11 | 2nd Regrind Sheet | .890 | −5.2 | 1.321 | — |
| 12 | Unaged Tray | .884 | −4.2 | 1.341 | 12.7 |
| 13 | Aged Tray | .868 | −2.1 | 1.361 | 35.4 |
| 14 | 3rd Regrind Sheet | .894 | −4.0 | 1.318 | — |
| 15 | Unaged Tray | .886 | −4.0 | 1.352 | 30.1 |
| 16 | Aged Tray | .852 | −1.4 | 1.357 | 34.5 |
| 17 | 4th Regrind Sheet | .902 | −4.1 | 1.320 | — |
| 18 | Unaged Tray | .920 | −4.4 | 1.350 | 26.6 |
| 19 | Aged Tray | .880 | −1.7 | 1.359 | 34.5 |
| 20 | 5th Regrind Sheet | .886 | −4.8 | 1.319 | — |
| 21 | Unaged Tray | .853 | −4.0 | 1.352 | 29.2 |
| 22 | Aged Tray | .885 | −2.0 | 1.362 | 38.1 |

*"b" value reported from Hunter Lab Color Tester

The data shown in Table III illustrates that trays made from film having the antioxidant added to the polyolefin component had excellent retention of the intrinsic viscosity, good retention of color and excellent crystallinity control through five regrind cycles. This degree of stability indicates that the material utilizing this method of stabilizing the polyolefin prior to addition of PET can be recycled a multitude of times without sacrificing strength and appearance properties of the finished tray. This ability to be recycled is of critical importance in commercial thermoforming operations where matrix scrap may exceed 40%.

What is claimed is:

1. A process for preparing a polyester-based composition which is particularly suitable for use in the manufacture of thermoformed, non-oriented, heat set, thin-walled articles which comprises: melt blending a stabilized polyolefin with polyethylene terephthalate wherein said stabilized polyolefin is a melt blend of a heat stabilizer and a polyolefin derived from olefin monomers containing from 2 to 6 carbon atoms; wherein said polyester-based composition contains from 0.5 to 15 weight percent of the polyolefin; and wherein said polyester-based composition contains an effective amount of the heat stabilizer.

2. The polyester-based composition made by the process specified in claim 1.

3. A polyester-based system capable of being formed into a composition adapted for the manufacture of thermoformed, non-oriented, heat set, thin-walled articles, said system comprising (1) a polyester component comprising a crystallizable polyethylene terephthalate resin, and, separately, (2) a polyolefin component adapted to be mixed with the polyester component to form a composition capable of being manufactured into thermoformed, non-oriented, heat set, thin-walled articles, said polyolefin component comprising: (1) a polyolefin derived from olefin monomers containing from 2 to 6 carbon atoms, and (b) an effective amount of a heat stabilizer.

4. A polyester-based system as specified in claim 3 wherein said polyolefin is selected from the group consisting of low density polyethylene, high density polyethylene, linear low density polyethylene, polypropylene, polyisopropylene, polybutene, polypentene and polymethylpentene.

5. A polyester-based system as specified in claim 4 wherein the polyethylene terephthalate has an intrinsic viscosity which is within the range of about 0.65 to about 1.2 as measured in a 60/40 by volume mixed solvent of phenol/tetrachloroethane at 30° C.

6. A polyester-based system as specified in claim 4 wherein the polyethylene terephthalate has an intrinsic viscosity which is within the range of about 0.8 to about 1.05 as measured in a 60/40 by volume mixed solvent of phenol/tetrachloroethane at 30° C.

7. A polyester-based system as specified in claim 6 wherein the polyethylene terephthalate has a moisture level of below 0.02 weight percent.

8. A polyester-based system as specified in claim 7 wherein the heat stabilizer is selected from the group consisting of alkylated substituted phenols, bisphenols, substituted bisphenols, thiobisphenols, polyphenols, thiobisacrylates, aromatic amines, organic phosphites and polyphosphites.

9. A polyester-based system as specified in claim 7 wherein the heat stabilizer is selected from the group consisting of primary polyamines, diarylamines, bisdiarylamines, alkylated diarylamines, ketone-diarylamines, condensation products, aldehyde-amine condensation products, and aldehyde amines.

10. A polyester-based system as specified in claim 7 wherein the heat stabilizer is a polyphenol.

11. A polyester-based system as specified in claim 7 wherein the heat stabilizer is selected from the group consisting of tetrakis(methylene 3-(3,5-di-t-butyl-4-hydroxyphenyl)-propionate)methane and 1,3,5-trimethyl-2,4,6-tris(3,5-di-t-butyl-4-hydroxybenzyl)benzene.

12. A polyester-based system as specified in claim 11 wherein the polyethylene terephthalate has a moisture level of below 0.005 weight percent.

13. A polyester-based system capable of being formed into a composition adapted for the manufacture of thermoformed, non-oriented, heat set, thin-walled articles, said system comprising: (1) a polyester component comprising a crystallizable polyethylene terephthalate resin, and, separately, (2) a polyolefin component adapted to be mixed with the polyester component to form a composition capable of being manufactured into thermoformed, non-oriented, heat set, thin-walled articles, said polyolefin component consisting of: (a) a polyolefin derived from olefin monomers containing from 2 to 6 carbon atoms, and (b) an effective amount of a heat stabilizer.

14. A polyester-based system capable of being formed into a composition adapted for the manufacture of thermoformed, non-oriented, heat set, thin-walled articles, said system comprising: (1) a polyester component consisting essentially of a crystallizable polyethylene terephthalate resin, and, separately, (2) a polyolefin component adapted to be mixed with the polyester component to form a composition capable of being manufactured into thermoformed, non-oriented, heat set, thin-walled articles, said polyolefin component comprising: (a) a polyolefin derived from olefin monomers containing from 2 to 6 carbon atoms, and (b) an effective amount of a heat stabilizer.

15. A process for manufacturing a thermoformed, non-oriented, heat-set, thin-walled article which comprises thermoforming the polyester-based system specified in claim 3 into said thermoformed, non-oriented, heat-set, thin-walled article.

16. A polyester-based system as specified in claim 3 wherein said polyolefin component is a melt blend of the polyolefin and the heat stabilizer.

17. A polyester-based system as specified in claim 3 wherein said polyolefin is linear low density polyethylene.

18. A thermoformed, non-oriented, heat-set, thin-walled article made by the process specified in claim 15.

19. A food tray made by thermoforming the polyester-based composition specified in claim 2.

20. A food tray made by utilizing the polyester-based system specified in claim 3.

* * * * *